(12) United States Patent
Keeble et al.

(10) Patent No.: US 7,160,036 B2
(45) Date of Patent: Jan. 9, 2007

(54) OPTICAL PACKAGE

(75) Inventors: Daniel John Keeble, Felixstowe (GB); Goncalo Agra Amorim, Ipswich (GB); David John Kenneth Meadowcroft, Stowmarket (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/858,961

(22) Filed: Jun. 2, 2004

(65) Prior Publication Data

US 2005/0018980 A1 Jan. 27, 2005

(30) Foreign Application Priority Data

Jul. 26, 2003 (GB) ................................. 0317593.2

(51) Int. Cl.
*G02B 6/36* (2006.01)

(52) U.S. Cl. .............................. 385/92; 385/88; 385/89

(58) Field of Classification Search .................. 385/92
See application file for complete search history.

(56) References Cited

U.S. PATENT DOCUMENTS

| 5,546,281 | A | 8/1996 | Poplawski et al. ........... 361/752 |
| 6,179,627 | B1 | 1/2001 | Daly et al. ................. 439/76.1 |
| 6,350,063 | B1 | 2/2002 | Gilliland et al. .............. 385/88 |
| 7,013,088 | B1 * | 3/2006 | Jiang et al. ................... 385/92 |
| 2003/0072540 | A1 | 4/2003 | Huang ......................... 385/92 |

FOREIGN PATENT DOCUMENTS

GB 2 322 748 9/1998

OTHER PUBLICATIONS

Patents Act 1977: Search Report under Section 17 for British Patent Application No. 0317593.2 dated Dec. 23, 2003.

* cited by examiner

*Primary Examiner*—Frank G. Font
*Assistant Examiner*—James P. Hughes

(57) ABSTRACT

An optical package that includes a component for supporting a printed circuit board. The optical package comprises a housing containing a printed circuit board having a connecting edge for connecting to external components; an optical component supported by the printed circuit board; an optical connector for coupling the optical component to an optical fiber; and a support supporting the connecting edge.

9 Claims, 5 Drawing Sheets

OPTICAL PACKAGE

FIELD OF THE INVENTION

This invention relates to an optical package including a component for supporting a printed circuit board (PCB).

DISCUSSION OF THE BACKGROUND ART

Standard packages housing such optical components are open at the rear in order to allow a connecting edge of a printed circuit board supporting one or more optical components to protrude. This can result in the printed circuit board flexing due to lack of rigidity.

Optical components such as optical transmitters and receivers require shielding in order to reduce electromagnetic interference (EMI) entering or leaving the component. In standard package designs EMI may escape from or enter the module via the rear of the package. Another problem with standard modules is that where two or more printed circuit boards are housed in a single package, the two PCB's are connected by soldered connection pins which adds an extra step in the manufacturing process hamper any reworking that may be required.

SUMMARY OF THE INVENTION

The above problems are alleviated by the present invention in which there is provided an optical package comprising a housing containing a printed circuit board having a connecting edge for connecting to external components; an optical component supported by the printed circuit board; an optical connector for coupling the optical component to an optical fibre; and a support supporting said connecting edge.

It is an advantage if the support is arranged to close any gap between the printed circuit board and the housing and in which the support has a metalised portion and a non-metalised portion, such that EMI radiation from and to the interior of the package is reduced. Preferably the non-metalised portion is immediately adjacent said connecting edge.

In order to alleviate the problems of supporting a printed circuit board upon a second printed circuit board, it is an advantage if the support also includes means for locating and supporting a second printed circuit board.

The support may be an injection moulded plastic component. Alternatively, the component could be manufactured by other processes, such as machining or metal injection moulding.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENT

Figure 1:
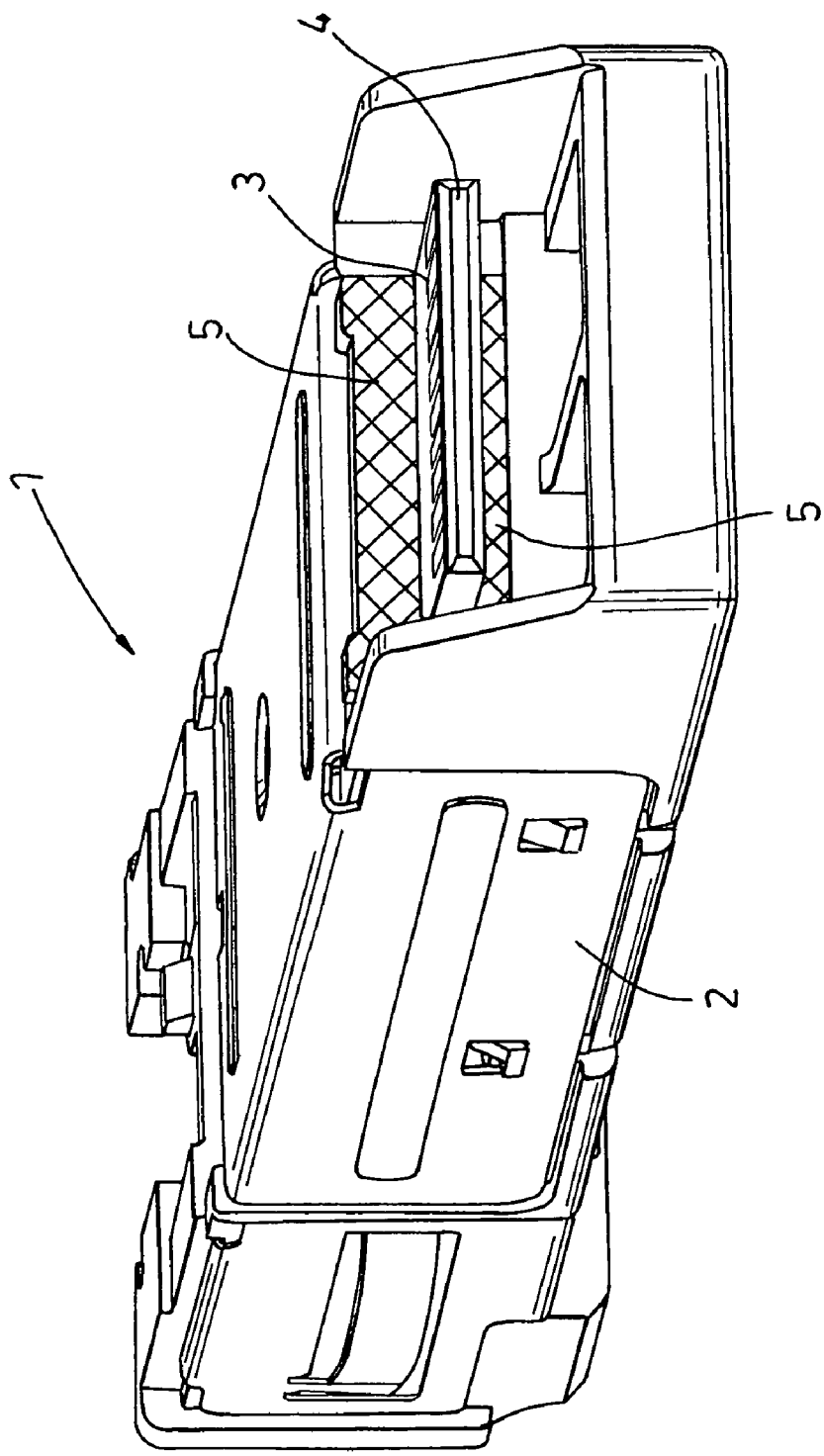
FIG. 1 illustrates a perspective view of an optical package having a printed circuit board support according to one aspect of the present invention.

Referring now to FIG. 1, and optical package 1 comprises a housing 2 containing a printed circuit board 3. The printed circuit board 3 has a connecting edge 4 having conventional metalised pads for plugging into a socket and for connection with external components. The printed circuit board supports one or more optical components (not shown) and has an optical connector (not shown) for connection to an optical fibre. The optical package has a support 5, which is marker with crossed lines for illustrative purposes, which supports the connecting edge of the printed circuit board. In conventional optical packages the area marked with crossed lines is left open, and the printed circuit board 3 is not supported.

Figure 2:
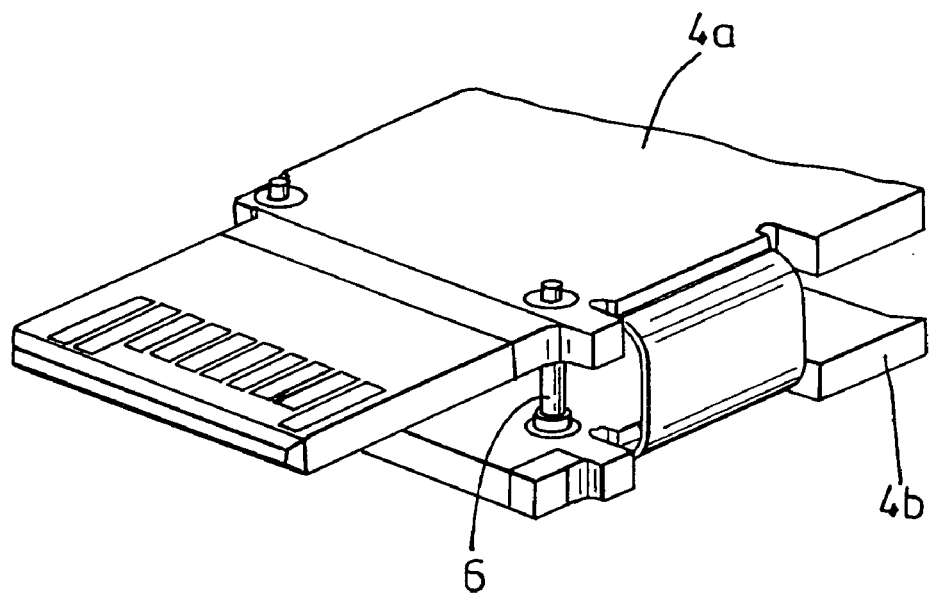
FIG. 2 illustrates two circuit boards connected by soldered pins.
Figure 3:
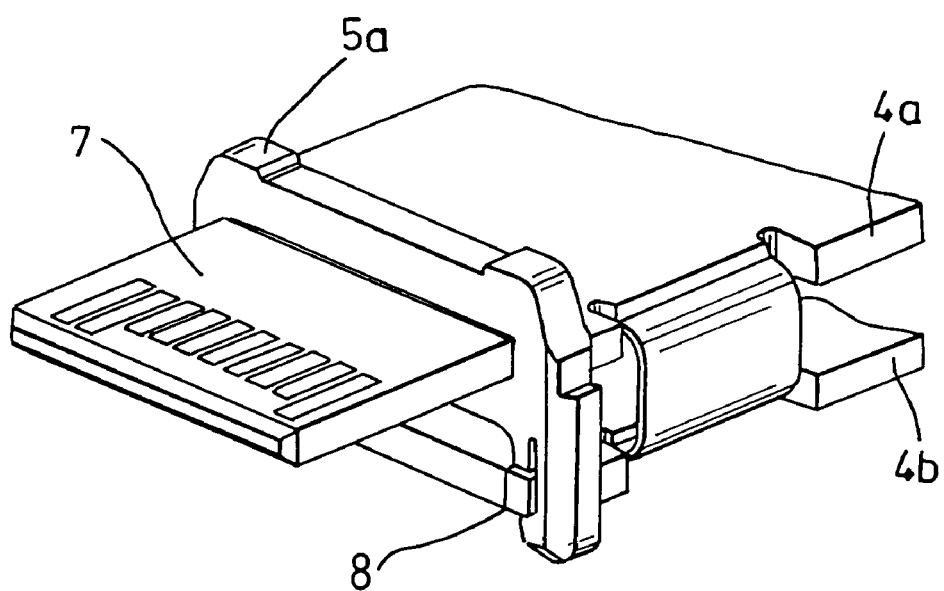
FIG. 3 illustrates a support including means for locating and supporting a second printed circuit board.

FIG. 2 illustrates two printed circuit boards 4a, 4b. Circuit boards 4a is mounted upon circuit board 4b by means of soldered securing pins, of which one securing pin 6 is shown. FIG. 3 illustrates a support 5a supporting both connecting the edge of the circuit board 4a in an aperture 7, and locating and supporting the second circuit board 4b by slots, of which one slot 8 is shown. In other embodiments there may be more than two printed circuit boards.

Figure 4:
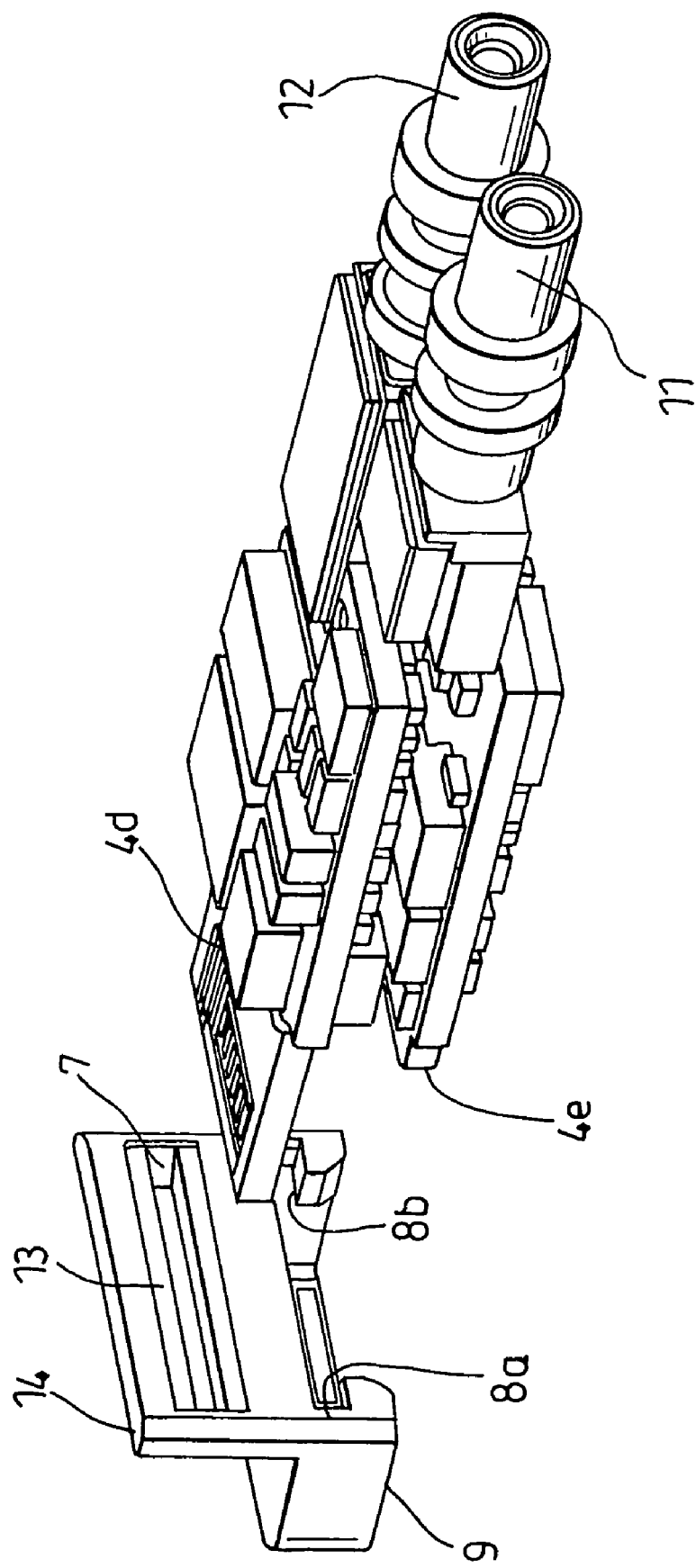
FIG. 4 illustrates a support according to a second embodiment of the present invention.

FIG. 4 illustrates a second embodiment of the invention showing a support 5b having a foot 9. Circuit board 4d is inserted through the aperture 7, and circuit board 4e is supported by slots 8a, 8b. In this view optical connectors 11, 12 are illustrated. It is an advantage if the support 5b is partially metalised. A non-metalised portion 13 surrounding the aperture 7 serves to electrically isolate the support 5b from the printed circuit board 4d, and metalised portion 14 serves to isolate the package from electromagnetic interference.

Figure 5:
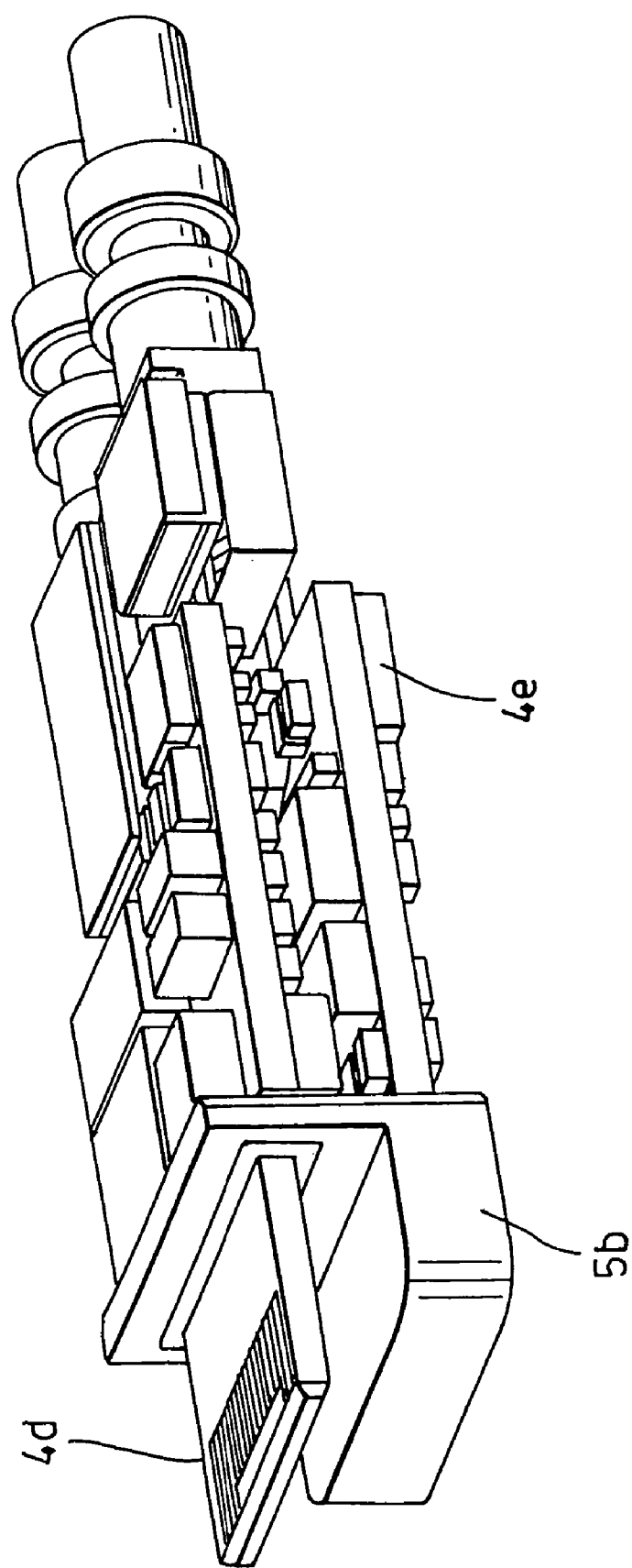
FIG. 5 illustrates the support of FIG. 4 from another angle, and in which circuit boards are located and supported.

FIG. 5 illustrates the support 5b located so as to support the circuit boards 4d and 4e.

Figure 6:
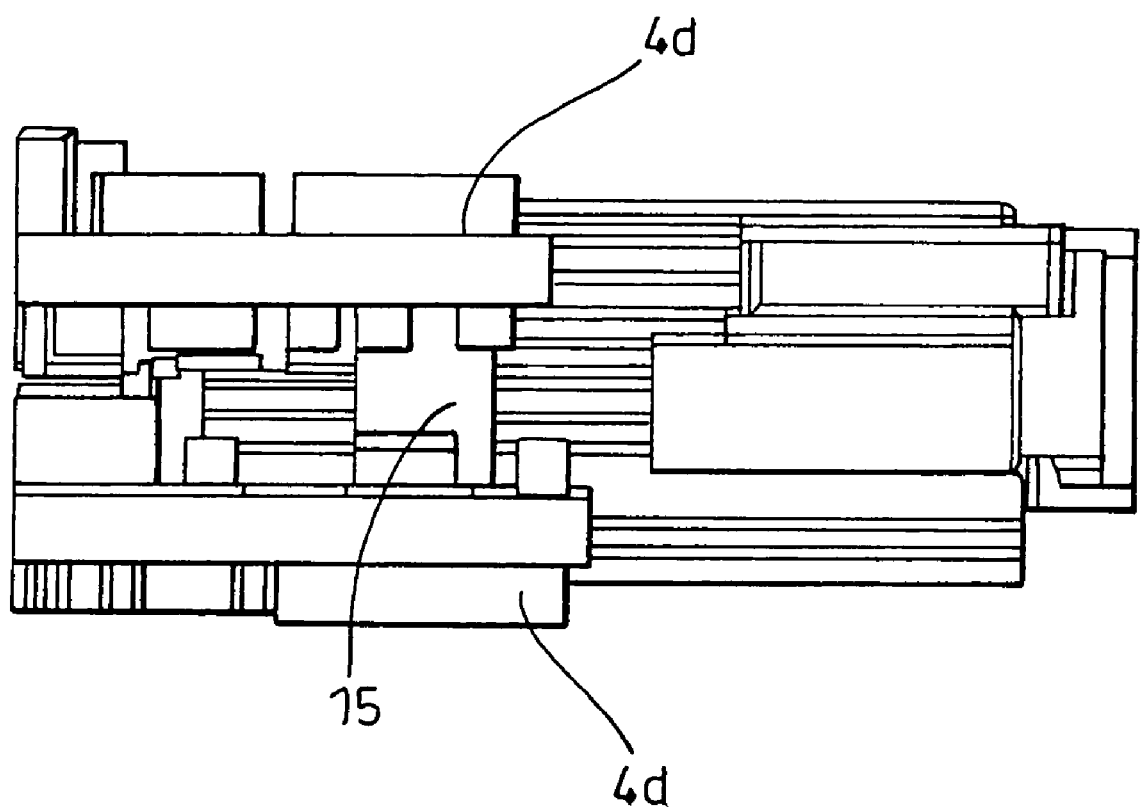
FIG. 6 illustrates use of a printed circuit board spacer for use in conjunction with certain embodiments of the present invention.

FIG. 6 illustrates a spacer 15, which serves to support the end of the circuit board 4d, which is remote from the support 5b. Use of a single spacer 15 is much more convenient than using three or more soldered location/securing pins.

The supports 5, 5b are manufactured by injection moulding a plastic material.

It will be understood that various alterations, modifications, and/or additions may be introduced into the constructions and arrangements of parts described above without departing scope of the present invention as defined in the following claims.

The invention claimed is:

1. An optical package comprising
a housing containing a printed circuit board having a connecting edge for connecting to external components;
an optical component supported by the printed circuit board;
an optical connector for coupling the optical component to an optical fibre; and
a support supporting said connecting edge, said support has at least one aperture, said connecting edge extends through said aperture,
wherein the support is arranged to close any gap between the printed circuit board and the housing and in which the support has a metalised portion and a non-metalised portion such that EMI radiation from and to the interior of the package is reduced, and wherein the non-metalised portion surrounds the at least one aperture to electrically isolate the support from the printed circuit board.

2. An optical package according to claim 1, in which the non-metalised portion is immediately adjacent said connecting edge.

3. An optical package according to claim 1, in which the support also includes means for locating and supporting a second printed circuit board.

4. An optical package according to claim 1, in which the support is an injection moulded plastic component.

5. An optical package according to claim 3, wherein said printed circuit board is mounted upon said second printed circuit board.

6. An optical package according to claim 1, wherein the metalised portion isolates the optical package from electromagnetic interference.

7. An optical package according to claim 1, further comprising a spacer to support an end of the circuit board remote from the support.

8. An optical package according to claim 1, wherein the support has a foot.

9. An optical package according to claim 3, wherein the means for locating and supporting a second printed circuit board are soldered securing pins, and wherein the support supports both connecting an edge of the circuit board in the at least one aperture and locating and supporting the second circuit board by slots.

* * * * *